United States Patent [19]
Pahle

[11] Patent Number: 5,245,782
[45] Date of Patent: Sep. 21, 1993

[54] FISHING LURE WITH SPLATTERED BLOOD SURFACE AND REFLECTIVE EYES IN DROOPING SIDE WINGS

[76] Inventor: William E. Pahle, 203 Madera St., Ventura, Calif. 93003

[21] Appl. No.: 838,544

[22] Filed: Feb. 19, 1992

[51] Int. Cl.$^5$ ............................................. A01K 85/00
[52] U.S. Cl. .................. 43/42.32; 43/42.37; 43/42.34
[58] Field of Search ............. 43/42.37, 42.39, 42.32, 43/42.33, 42.34

[56] References Cited

U.S. PATENT DOCUMENTS

| 1,639,863 | 8/1927 | Sinclair et al. | 43/42.32 |
| 2,575,797 | 11/1951 | Corsi | 43/42.39 |
| 4,790,100 | 12/1988 | Green | 43/42.37 |

FOREIGN PATENT DOCUMENTS

| 457033 | 5/1949 | Canada | 43/42.34 |

*Primary Examiner*—Kurt C. Rowan
*Attorney, Agent, or Firm*—Robert M. Wallace

[57] ABSTRACT

The invention is a fishing lure having a lure body supporting a fish hook, the lure body having an exterior surface bearing a blood-splattered pattern, a pair of downward wings and a reflective eye in each of the wings, the fish hook extending in a direction corresponding to that of the drooping wings, whereby the eyes are visible to an observer from either side of the lure as well as from the top or bottom, light transmissive chambers extending from the rear of each of the eyes to a back surface of each of the wings, whereby to admit light rearwardly into each of the eyes, and a concave bottom surface on the lure body. A brush feather extends upwardly from the lure body in a plane of the hook and extending away from the hook, whereby to provide a rudder stabilization function during travel of the lure body through water. A flexible fish model is preferably impaled on the hook, the fish model having plural tail tips which flutter in response to water flow past the lure.

17 Claims, 4 Drawing Sheets

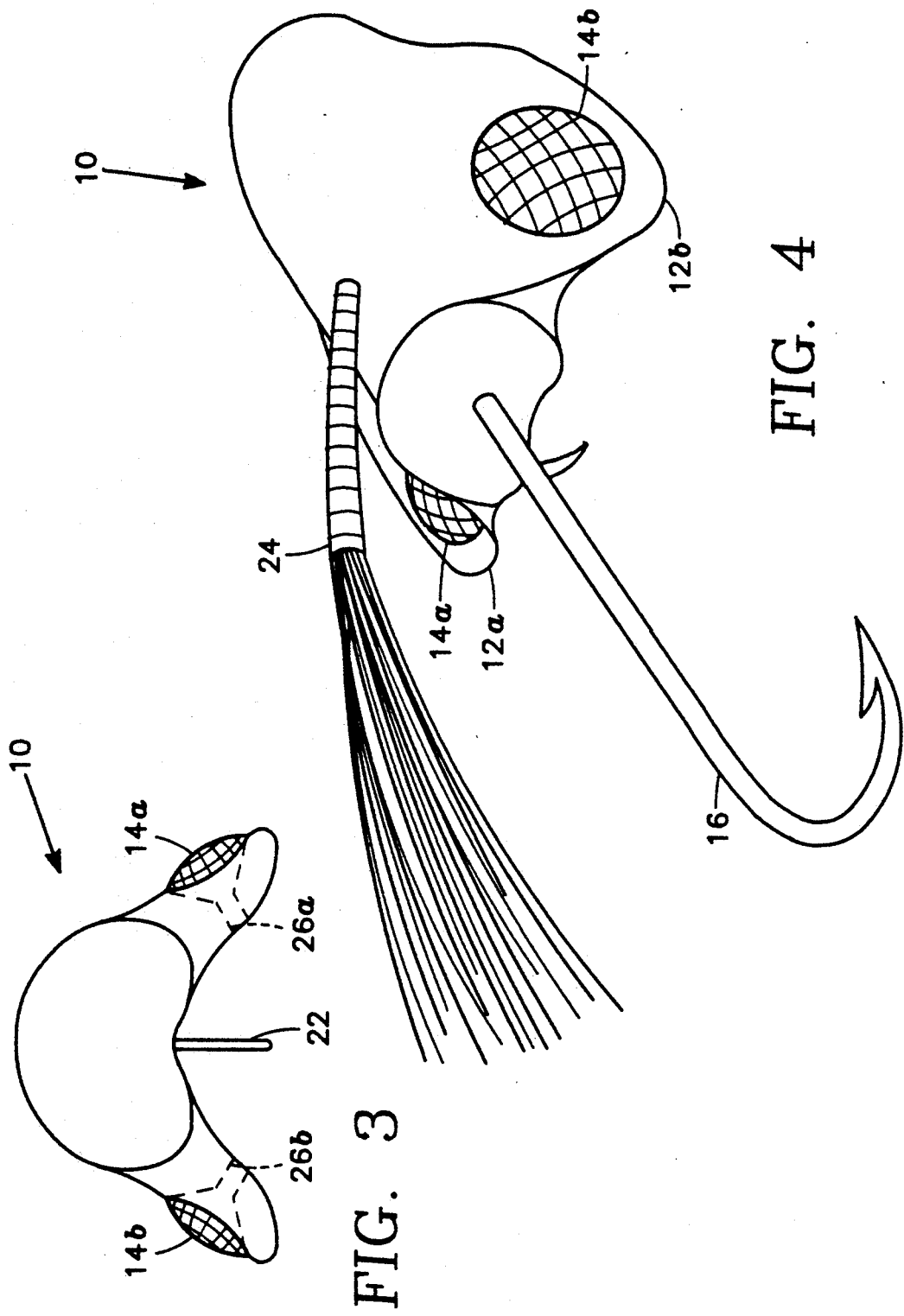

FISHING LURE WITH SPLATTERED BLOOD SURFACE AND REFLECTIVE EYES IN DROOPING SIDE WINGS

BACKGROUND OF THE INVENTION

1. Technical Field

The invention is related to fishing lures and particularly to fishing lures for fishing in waters where the fish have been saturated with bait and are not biting.

2. Background Art

Fishing lures of various designs for achieving hydrodynamic effects and outer appearance most attractive to a fish are well known. For example, a fishing lure having a mottled appearance is disclosed in U.S. Pat. No. 2,036,075. A fishing lure having a pair of planar parallel wings each supporting an eye is disclosed in U.S. Pat. No. 4,827,660. A fishing lure having a brush feather attached to the lure and pointing toward the point of the hook is disclosed in U.S. Pat. No. 2,112,180.

The problem with these lures is that they all have limited performance, particularly in waters where the fish are already well-fed or in bait-saturated waters. What is needed is a lure that compels the fish to bite under any circumstance.

SUMMARY OF THE INVENTION

I have discovered that fish respond most strongly to a lure having a blood-splattered appearance, most resembling a wounded marine animal. A fishing lure embodying the invention has a lead head whose outer surface has a light colored (e.g., yellow) background with a splattered pattern over the background, preferably of red color so that the pattern is that of splattered blood. As a result of the dramatic success enjoyed through use of the present invention, it is surmised that the genetic predatory behavior of fish includes a simple pattern recognizer keyed to a blood splattered appearance, which is fully stimulated by the present invention as no lure before has ever done.

The lure flies through the water with a pair of drooping side wings integrally formed with the lead head, each drooping wing having a multi-faceted sunlight-reflective eye mounted in its outer surface with a light-transmissive hole to the eye extending from the inner surface of the wing, so as to attract fish too far away to discern the blood splattered pattern. Each eye reflects light received from either the front of the eye or from the rear through the light-transmissive hole. The wings enable the lure to ascend and descend realistically in straight-line paths and to glide in a horizontal path. The drooping aspect of the wings enables the eyes to be seen from either side of the lure as well as from the top and bottom of the lure. However, the drooping aspect of the wings may also reduce the roll stability of the lure. In order to provide greater roll stability, a brush tail extends upwardly from the body of the lead head away from the hook point and, by virtue of its upward attitude, acts as a stabilizing rudder for the lure as it flies through the water.

The brush tail, by extending upwardly away from the hook, leaves a fish (scampi) replica impaled on the hook free to flutter its artificial tails as the lure moves through the water. Furthermore, the upward pointing brush tail takes on the appearance of a dorsal fin, further enhancing the attraction of the lure. Another feature of the invention which increases the lure's stability and increases the water flow to the fluttering tails of the artificial scampi replica is a smooth concavity in the bottom surface of the lure. Preferably, the bottom surface is spherically concave up to one-third the height of the lure at the maximum point of concavity.

The lure operates as follows: as the fish views the lure flying nearly horizontally through the water from either the side or from the top of the lure, it sees the light reflected by at least one of the eyes in the wings and it also sees the blood splattered pattern on the surface of the lure body. As the fish moves toward the lure for a strike, its nose is tickled at the penultimate moment by the distal end of the brush feather, and at this point the fish bites down hard on the hook. Preferably, a flexible plastic replica of the type well-known in the art of the rear half of a scampi is slid over the hook and attracts the fish toward the hook.

BRIEF DESCRIPTION OF THE DRAWINGS

FIG. 3 is a front view corresponding to FIG. 1.

FIG. 4 is a perspective top view corresponding to FIG. 1.

DETAILED DESCRIPTION OF THE INVENTION

Figure 1:
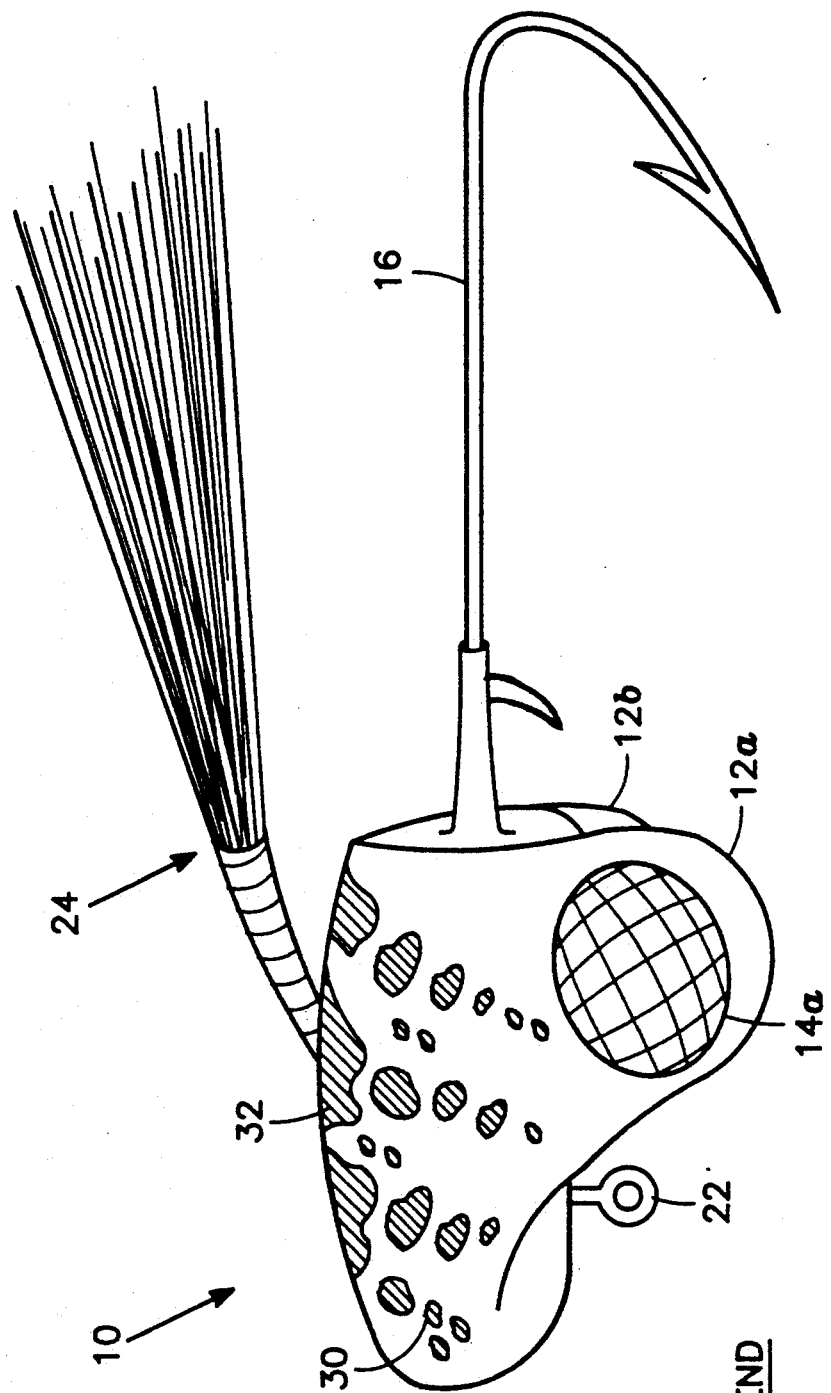
FIG. 1 is a side view of the preferred embodiment of the invention.
Figure 2:
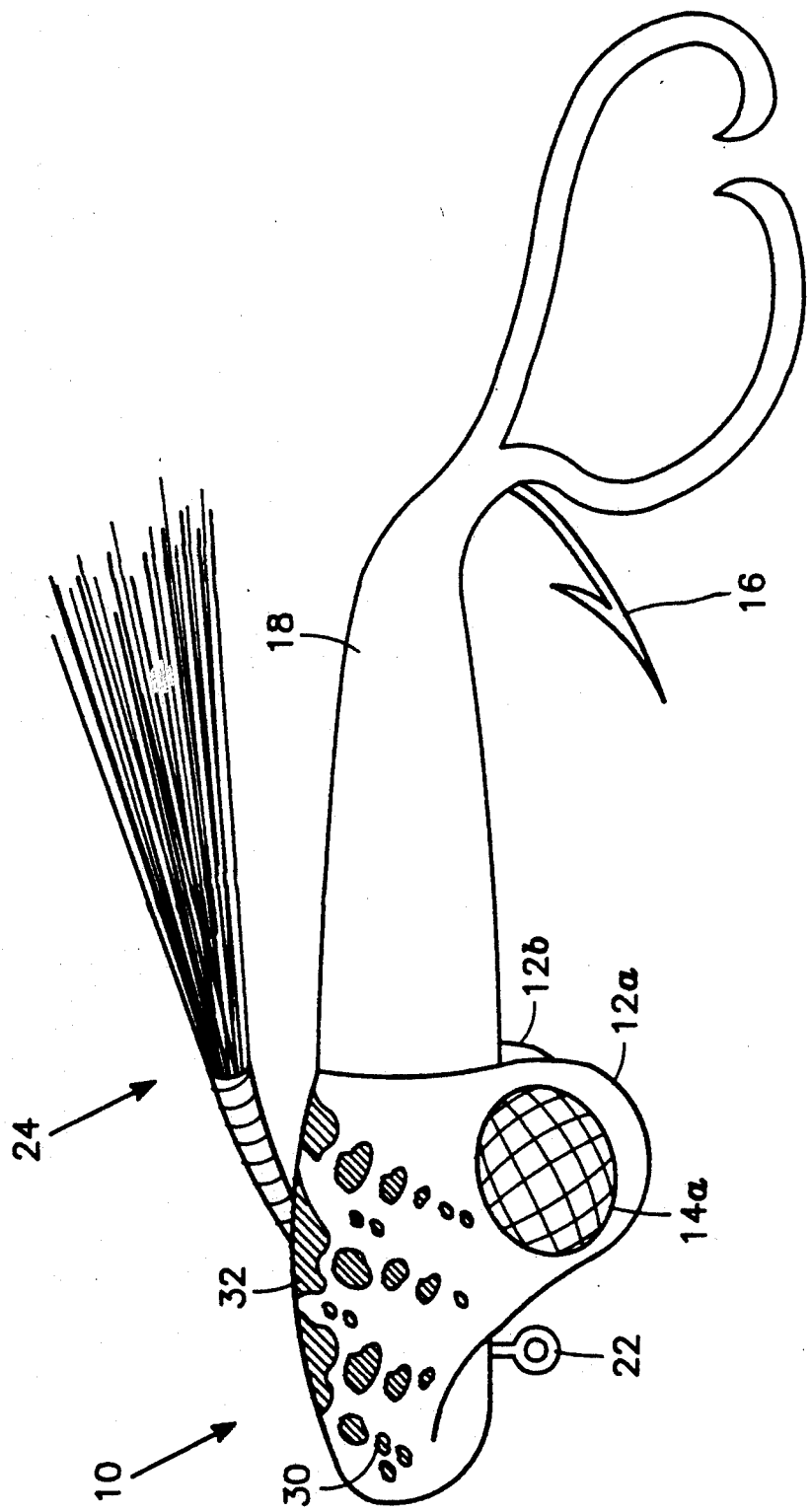
FIG. 2 is a side view corresponding to FIG. 1 showing how the flexible scampi replica is mounted on the hook.

Referring to FIGS. 1-4, the preferred embodiment of the invention includes a lure body 10, preferably an integrally formed body of lead, for example. A pair of wings 12a, 12b integrally formed with the body 10 droop down slightly from the body 10, each supporting a multi-facet reflective eye 14a, 14b of the type well-known in the art. A fish hook 16 extends out the back end of the body 10 and curves downwardly to a sharp point. As shown in FIG. 2, the hook 16 receives a realistically flexible replica of the rear half of a scampi 18. As is well-known in the art, the tails 20a 20b of the scampi replica actually flutter as the lure body 10 is drawn through the water by a fishing line (not shown) attached to an eyelet 22 of the body 10. The rounded nose 10a of the body 10 and the drooping wings 12a, 12b provide the requisite hydrodynamic characteristics for "flying" through the water. A brush feather 24 is attached at its head to the top of the lure body 10 and extends upwardly away from the hook 16, and in this configuration performs two functions. First, it acts as a rudder stabilizer for the lure and second it stimulates the fish's nose at it nears the hook 16. The multi-facted eyes 14a, 14b receive light through their front surfaces as well as through light transmissive chambers 26a, 26b in the back surfaces of the wings 12a, 12b, and internally reflect the light among their multi-faceted surfaces for maximum return of light toward the observer. The drooping aspect of the wings 12a, 12b renders the eyes 14a, 14b visible from the side of the lure, so as to increase the visibility of the lure.

The bottom surface of the lure body 10 is spherically concave, as indicated in hidden line in the side view of FIG. 1, up to about one-third the height of the lure body 10 at the peak 10a of concavity.

Figure 5:
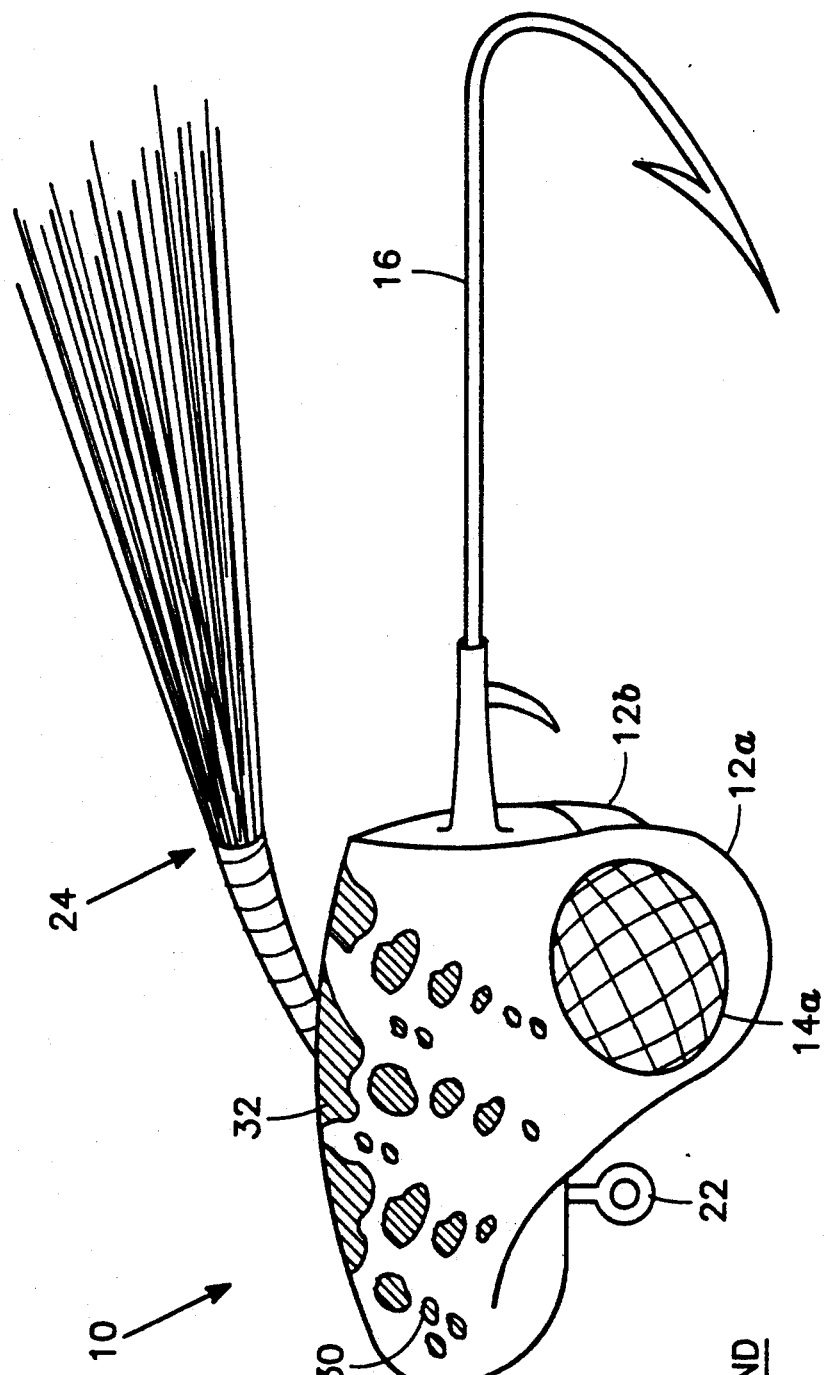
FIG. 5 is a side view of an alternative embodiment of the invention having a darker background color than FIG. 1 for the blood splattered pattern.

The blood splattered pattern consists of red painted spots 30 of decreasing radii and increasing spacing from a center region 32 from which the spots radiate in a quasi-random distribution, as the term "splattered" is understood in this specification. This effect is best attained by splattering red paint on the surface of the lure 10. Preferably, the background is yellow although it may be orange as illustrated in FIG. 5. The blood-splattered pattern of the invention is superior to the mottled pattern of U.S. Pat. No. 2,036,075 because it is a more realistic resemblance to a wound on a marine animal and it is my descovery that the fish's predatory behavior is stimulated more by the blood-splattered lure than a mottled lure.

I have tested the lure described above, which I call the "Bloody Good Catch Lure", over 500 hours of actual salt water fishing and have found that it out-performs all other lures of which I am aware for catching any fish including bigger game fish such as halibut.

While the invention has been described by specific reference to preferred embodiments thereof, it is understood that variation and modifications thereof may be made without departing from the true spirit and scope of the invention.

What is claimed is:

1. A fishing lure comprising:
a lure body supporting a hook, said lure body having an exterior surface bearing a splattered pattern;
a pair of sloping wings extending non-horizontally with respect to a line of flight of said lure through water and a reflective eye in each of said wings, said fish hook extending in a direction corresponding to that of said sloping wings; and
light transmissive chambers extending from the rear of each of said eyes to a back surface of each of said wings, whereby to admit light rearwardly into each of said eyes.

2. The fishing lure of claim 1 wherein said splattered pattern comprises a plurality of spots on a light background, said spots radiating form a center region on said surface in a quasi-random distribution, said spots having increasingly spacing therebetween and decreasing spot size with increasing distance from said center region.

3. The fishing lure of claim 2 wherein said spattered pattern comprises a red splattered pattern on a light colored background so as to provide a blood splattered appearance.

4. The fishing lure of claim 1 wherein said wings slope downwardly with respect to said line of flight, whereby said eyes are visible to an observer from one side of said lure.

5. The fishing lure of claim 4 wherein said eyes are multi-faceted eyes whereby to create internal reflections of light received from said light transmissive chambers or from frontal surfaces of said eyes.

6. The fishing lure of claim 1 further comprising a brush feather means extending upwardly from a top surface of said lure body in a plane of said hook and extending away from said hook, whereby to provide a rudder stabilization function during travel of said lure body through water.

7. The fishing lure of claim 6 further comprising a flexible fish model impaled on said hook, said fish model having plural tail tips which flutter in response to water flow past said lure to attract fish towards the hook.

8. The fishing lure of claim 1 wherein said lure body has a front nose having a rounded hydrodynamic profile, said fishing lure further comprising a concave bottom surface.

9. A fishing lure comprising a lure body and a pair of drooping wings extending from said lure body and an eye in each of said wings, and a fish hook extending from said lure body and light transmissive chambers extending from the rear of each of said eyes to a back surface of each of said wings, whereby to admit light into the rear end of each of said eyes.

10. The fishing lure of claim 9 wherein said wings droop downwardly with respect to said line of flight, whereby said eyes are visible to an observer from one side of said lure.

11. The fishing lure of claim 9 wherein said eyes are multi-faceted eyes whereby to create internal reflections of light from said light transmissive chambers.

12. The fishing lure of claim 9 further comprising a brush feather means extending upwardly from a top surface of said lure body in a plane of said hook but extending away from said hook, whereby to provide a rudder stabilization function during travel of said lure body through water.

13. The fishing lure of claim 12 further comprising a flexible fish model impaled on said hook.

14. The fishing lure of claim 9 further comprising a cylindrically concave bottom surface along at least nearly the entire length of said lure body.

15. A fishing lure comprising:
a lure body supporting a hook, said lure body having an exterior surface bearing a splattered pattern, wherein said splattered pattern comprises a plurality of spots on a light background, said spots radiating from a center region on said surface in a quasi-random distribution, said spots having increasing spacing therebetween and decreasing spot size with increasing distance from said center region, wherein said splattered pattern comprises a red splattered pattern on a light colored background so as to provide a blood splattered appearance;
a pair of sloping wings extending non-horizontally with respect to a line of flight of said lure through water and a reflective eye in each of said wings, said fish hook extending in a direction corresponding to that of said drooping wings, wherein said wings slope downwardly with respect to said line of flight, whereby said eyes are visible to an observer from one side of said lure;
light transmissive chambers extending from the rear of each of said eyes to a back surface of each of said wings, whereby to admit light rearwardly into each of said eyes; and
a concave bottom surface on said lure body.

16. The fishing lure of claim 15 further comprising:
brush feather means extending upwardly from a top surface of said lure body in a plane of said hook and extending away from said hook, whereby to provide a rudder stabilization function during travel of said lure body through water; and
a flexible fish model impaled on said hook, said fish model having plural tail tips which flutter in response to water flow past said lure.

17. The fishing lure of claim 15 wherein said eyes are multi-faceted.

* * * * *